United States Patent
Wu et al.

(10) Patent No.: US 12,013,917 B2
(45) Date of Patent: Jun. 18, 2024

(54) METHOD FOR CONSTRUCTING A CONVOLUTION NEURAL NETWORK BASED ON FARMLAND IMAGES, ELECTRONIC DEVICE USING THE SAME

(71) Applicant: FJ Dynamics Technology Co., Ltd, Xiangyang (CN)

(72) Inventors: Di Wu, Nanjing (CN); Zhao-Di Chen, Xiangyang (CN); Min-Xin Chen, Xiangyang (CN); Chen-Jian Wu, Xiangyang (CN); Hong Chen, Xiangyang (CN)

(73) Assignee: FJ Dynamics Technology Co., Ltd, Xiangyang (CN)

( * ) Notice: Subject to any disclaimer, the term of this patent is extended or adjusted under 35 U.S.C. 154(b) by 334 days.

(21) Appl. No.: 17/526,357

(22) Filed: Nov. 15, 2021

(65) Prior Publication Data

US 2022/0076068 A1   Mar. 10, 2022

Related U.S. Application Data

(63) Continuation-in-part of application No. PCT/CN2019/107859, filed on Sep. 25, 2019.

(30) Foreign Application Priority Data

May 17, 2019   (CN) .......................... 201910411396.1

(51) Int. Cl.
*G06F 18/214* (2023.01)
*G06F 18/21* (2023.01)
*G06F 18/25* (2023.01)
*G06N 3/08* (2023.01)
(Continued)

(52) U.S. Cl.
CPC ........ *G06F 18/214* (2023.01); *G06F 18/2163* (2023.01); *G06F 18/217* (2023.01);
(Continued)

(58) Field of Classification Search
CPC ...... G06V 20/46; G06V 20/188; G06V 10/82; G06N 3/08; G06N 3/045; G06N 3/048;
(Continued)

(56) References Cited

FOREIGN PATENT DOCUMENTS

| CN | 107610141 | 1/2018 |
| CN | 108710863 | 10/2018 |

(Continued)

OTHER PUBLICATIONS

Sa, Inkyu, et al. "WeedMap: A large-scale semantic weed mapping framework using aerial multispectral imaging and deep neural network for precision farming." arXiv preprint arXiv:1808.00100 (2018). (Year: 2018).*

(Continued)

*Primary Examiner* — Vu Le
*Assistant Examiner* — Tracy Mangialaschi
(74) *Attorney, Agent, or Firm* — ScienBiziP, P.C.

(57) ABSTRACT

A method for constructing a convolutional neural network model based on farmland images is applied in an electronic device. The method includes following steps: obtaining a number of farmland images of at least one farmland; obtaining a plurality of standard segmentation farmland images corresponding to each of the farmland images; dividing the farmland images and the standard segmentation farmland images into a training image set and a test image set; taking the farmland images and the standard segmentation farmland images in the training image set as input of a convolutional neural network, and constructing a convolutional neural network model based on the farmland images; and verifying the convolutional neural network model by using the farmland images in the test image set and the standard segmentation farmland images, and optimizing a plurality of parameters of the convolutional neural network model based on the farmland images.

13 Claims, 8 Drawing Sheets

(51) Int. Cl.
*G06T 3/40* (2024.01)
*G06V 20/40* (2022.01)

(52) U.S. Cl.
CPC .............. *G06F 18/25* (2023.01); *G06N 3/08* (2013.01); *G06T 3/40* (2013.01); *G06V 20/46* (2022.01)

(58) Field of Classification Search
CPC ...... G06F 18/214; G06F 18/217; G06F 18/25; G06F 18/2163; G06T 7/11; G06T 3/40; G06T 2207/20084; G06T 2207/30188
See application file for complete search history.

(56) References Cited

FOREIGN PATENT DOCUMENTS

| | | |
|---|---|---|
| CN | 109086799 | 12/2018 |
| CN | 109711449 | 5/2019 |
| CN | 109740631 | 5/2019 |

OTHER PUBLICATIONS

Paszke, Adam, et al. "Enet: A deep neural network architecture for real-time semantic segmentation." arXiv preprint arXiv:1606.02147 (2016). (Year: 2016).*

Zhao, Hengshuang, et al. "ICNet for Real-Time Semantic Segmentation on High-Resolution Images." arXiv preprint arXiv:1704.08545v2 (2018). (Year: 2018).*

Dijkstra, Klaas, et al. "Centroidnet: A deep neural network for joint object localization and counting." Machine Learning and Knowledge Discovery in Databases: European Conference, ECML PKDD 2018, Dublin, Ireland, Sep. 10-14, 2018, Proceedings, Part III 18. Springer Int'l. Publishing, 2019. (Year: 2019).*

Kemker, Ronald, Carl Salvaggio, and Christopher Kanan. "Algorithms for semantic segmentation of multispectral remote sensing imagery using deep learning." ISPRS journal of photogrammetry and remote sensing 145 (2018): 60-77. (Year: 2018).*

Adam Paszke et al., ENet: A Deep Neural Network Architecture for Real-Time Semantic Segmentation, arXiv:1606.02147v1, arxiv.org, Jun. 7, 2016, https://arxiv.org/abs/1606.02147.

Inkyu SA et al:"WeedMap: A large-scale semantic weed mapping framework using aerial multispectral imaging and deep neural network for precision farming" arxiv.org, Cornell University Library, 201 Olin Library Cornell University Ithaca, NY14853, Aug. 2018 (Aug. 1, 2018), XP080912029.

Mazzint Davide et al:"A CNN Architecture for Efficient Semantic Segmentation of Street Scenes", 2018 IEEE 8th International Conference on Consumer Electronics-Berlin (ICCE-Berlin), IEEE, Sep. 2, 2018 (Sep. 2, 2018), pp. 1-6, xp 033474990, DOI: 10.1109/ICCE-BERLIN.2018.8576193.

\* cited by examiner

METHOD FOR CONSTRUCTING A CONVOLUTION NEURAL NETWORK BASED ON FARMLAND IMAGES, ELECTRONIC DEVICE USING THE SAME

FIELD

The present disclosure relates to a field of artificial intelligence, especially relates to a method for constructing a convolution neural network based on farmland images, an electronic device using the same.

BACKGROUND

With the progress of modern science and technology and the continuous development of modern high-efficiency agriculture, people pay more attention to the irreplaceable position and role of the automatic control technology in the process of agricultural modernization. Agricultural automation greatly improves labor productivity, reduce labor intensity, increase labor comfort, and provide high efficiency and high-precision mechanization of agricultural production. The development of automation is an inevitable choice.

Especially in recent years, a concept of precision agriculture emerges. In precision agriculture, the understanding of farmland scene is necessary for the development and progress of precision agriculture. The automatic information acquisition method based on computer and related agricultural knowledge theory is gradually replacing the traditional information acquisition method and becoming the main means of agricultural information acquisition.

In agricultural information acquisition technology, a main research topic faced by precision agriculture is how to accurately, effectively, and comprehensively identify the agricultural resource and working environment, namely, scene understanding. The development of precision agriculture requires to use computers to make agricultural machinery have an ability to perceive their surroundings, and independently carry out agricultural tasks based on image segmentation in farmland scene, farmland target detection and recognition, 3D information acquisition, etc., so as to complete various tasks in farmland scene field. With a deepening research and development of technology, a variety of solutions, including semantic segmentation, have been put forward, progressing and developing agricultural productivity.

The traditional agricultural network production mode carries out a traditional management of the farmland and the orchard. The spatial difference of crop information distribution is not considered in the operation of fertilization, weeding, spraying, and farming, which leads to high production cost and an increase in environmental pollution.

In order to solve these problems, precision agriculture has become a trend of the agricultural development, and the semantic segmentation of farmland images is the premise and foundation of precision agriculture. Deep learning method can play an extremely important role in farmland image segmentation. Convolutional neural networking has achieved advantageous results in many image analysis tasks such as segmentation and classification, and shows strong applicability.

At present, research methods of image semantic segmentation have entered into the field of deep learning. These processes still face problems, such as the segmentation results not being fine enough and the relationship between pixels not being fully considered, leading to loss of image details and lack of spatial consistency in semantic segmentation.

At the same time, many phenomena are found in the farmland scene, such as more category information, unclear semantic object outline, update of crop state, and complex and changeable natural environment, which affect the accuracy and adaptability of semantic segmentation.

SUMMARY

The Present disclosure provides a method for constructing a convolution neural network in relation to images of farmland, and a system of the method, wherein the method for constructing a convolution neural network based on farmland images leads a convolution neural network in a segmentation of the farmland images to identify an accuracy of the segmentation of the farmland images.

The present disclosure further provides a method for constructing a convolution neural network based on farmland images and a system, wherein the method for constructing a convolution neural network based on farmland image inputs the farmland image as training sample into the convolution neural network to carry out a real-time semantic segmentation of the farmland image, so as to improve an accuracy of the semantic segmentation of the farmland image.

The present disclosure further provides a method for constructing a convolution neural network based on farmland images and a system, wherein an effective and available farmland image data set is constructed in a construction process of the convolution neural network based on the farmland images.

The present disclosure further provides a method for constructing a convolution neural network based on farmland images and a system, wherein a multi-resolution network method is used to train the farmland images with different resolution sizes by independent networks, a same label is used in the same image area of the farmland images at different resolutions, and an interaction between pixels of the farmland images is strengthened.

The present disclosure further provides a method for constructing a convolution neural network based on farmland images and a system, wherein the convolution neural network with a randomization condition is used to fully consider details of the farmland images, refine edges, and enhance an effect of image segmentation.

The present disclosure further provides a method for constructing a convolution neural network based on farmland images and a system, wherein an optimized ENet network is used to carry out image segmentation, having strong practicability and effectiveness.

The present disclosure further provides a method for constructing a convolution neural network based on farmland images and a system, wherein the convolutional neural network is combined with parameters of batchnorm layer, and the parameters of batchnorm layer are merged into convolution layer to improve a testing speed of the model.

The present disclosure further provides a method for constructing a convolution neural network based on farmland images and a system, wherein the method and the system are simple and easy to implement.

The present disclosure further provides a method for constructing a convolution neural network based on farmland images and a system, wherein a convolution neural network model based on the farmland image constructed by the method has a high image segmentation efficiency and is conveniently implemented.

In order to achieve at least one of the above objects of the disclosure, the present disclosure provides a method for constructing a convolution neural network in relation to farmland images, the method includes:

step 101, obtaining a plurality of farmland images of at least one farmland;

step 102, obtaining a plurality of standard segmented farmland images corresponding to the plurality of farmland images;

step 103, dividing the plurality of farmland images and the plurality of standard segmented farmland images into a training image set and a testing image set;

step 104, taking the plurality of farmland images and the plurality of standard segmented farmland images in the training image set as an input of the convolution neural network, and constructing a convolution neural network model based on the plurality of farmland images;

step 105, verifying the convolution neural network model based on the farmland images by the plurality of farmland images and the standard segmented farmland images in the testing image set, and optimizing a plurality of parameters of the convolution neural network model based on the farmland images.

According to an embodiment of the present disclosure, between the step 102 and the step 103, the method further includes:

step 106, converting the plurality of farmland images and the plurality of standard segmented farmland images into a plurality of single channel grayscale images; and step 107, preprocessing the plurality of farmland images and the plurality of standard segmented farmland images and amplifying the plurality of farmland images and the plurality of standard segmented farmland images to increase diversity of the plurality of farmland images and the plurality of standard segmented farmland images.

According to an embodiment of the present disclosure, the step 101 further includes:

step 1011, obtaining at least one video of the at least one farmland;

step 1012, extracting the farmland images in the at least one video according to a plurality of image frames;

step 1013, eliminating farmland images that do not accord with a preset condition.

According to an embodiment of the present disclosure, the step 103 further includes: dividing the farmland images and the standard segmented farmland images into the training image set and the testing image set in the ratio of 8:2.

According to an embodiment of the present disclosure, the convolution neural network is ENet network with a PReLU activation function, $$PReLU(x_i) = \begin{cases} x_i & \text{if } x_i > 0 \\ a_i x_i & \text{if } x_i \leq 0 \end{cases},$$

ai is a learnable parameter.

According to an embodiment of the present disclosure, the step 104 further includes:

step 1041, converting the farmland images and the standard segmented farmland images in the training image set respectively into a variety of images with different resolutions;

step 1042, processing the variety of images with different resolutions by a plurality of independent convolution neural networks to obtain a plurality of feature images;

step 1043, scaling the plurality of feature images into the feature images with the same resolution, and merging the scaled feature images into a fusion image;

step 1044, inputting the fusion image into the convolution neural network, and constructing the convolution neural network model based on the farmland image.

According to an embodiment of the present disclosure, the step 1041 further includes: converting the farmland images and the standard segmented farmland images in the training image set into images of three different resolutions, wherein the images with three different resolutions comprise images with a full resolution 480*640, images with a half resolution 240*320, and images with a three-quarter resolution 360*480.

According to an embodiment of the present disclosure, the step 1042 further includes:

processing the images with full resolution 480*640 by an improved ENet network to obtain the feature images corresponding to the images with full resolution 480*640;

processing the images with half resolution 240*320 and the images with three-quarters resolution 360*480 by the ENet network to obtain the feature images corresponding to the images with half resolution 240*320 and the images with three-quarters resolution 360*480.

According to an embodiment of the present disclosure, the step 105 further includes: merging a plurality of parameters of BatchNorm layers of an optimized convolutional neural network model into the convolution layers of the convolutional neural network model to improve a testing speed of the convolutional neural network model.

According to an embodiment of the present disclosure, the step 105 further includes: adding Gaussian condition to an optimized convolution neural network model for random processing, and refining a boundary segmentation of the convolution neural network model.

According to another aspect of the present disclosure, the present disclosure provides a convolution neural network model based on farmland images, the convolution neural network model based on the farmland images is applied in a method for constructing a convolution neural network based on the farmland images, the method includes:

step 101, obtaining a plurality of farmland images of at least one farmland;

step 102, obtaining a plurality of standard segmented farmland images corresponding to the plurality of farmland images;

step 103, dividing the plurality of farmland images and the plurality of standard segmented farmland images into a training image set and a testing image set;

step 104, taking the plurality of farmland images and the plurality of standard segmented farmland images in the training image set as an input of the convolution neural network, and constructing the convolution neural network model based on the plurality of farmland images;

step 105, verifying the convolution neural network model based on the farmland images by the plurality of farmland images and the standard segmented farmland images in the testing image set, and optimizing parameters of the convolution neural network model based on the farmland images.

According to an embodiment of the present disclosure, the present disclosure provides an electronic device, the electronic device includes:
a processor; and
a non-transitory storage medium coupled to the processor and configured to store a plurality of instructions, which cause the processor to:
obtain a plurality of farmland images of at least one farmland;
segment the farmland images to obtain a plurality of standard segmented farmland images corresponding to the plurality of farmland images;
construct a convolution neural network model based on the plurality of farmland images and the plurality of standard segmented farmland images.

According to an embodiment of the present disclosure, the plurality of instructions are further configured to cause the processor to:
convert the plurality of farmland images and the plurality of standard segmented farmland images into single channel grayscale images.

According to an embodiment of the present disclosure, the plurality of instructions are further configured to cause the processor to:
amplify the plurality of farmland images and the plurality of standard segmented farmland images.

According to an embodiment of the present disclosure, the plurality of instructions are further configured to cause the processor to:
divide the plurality of farmland images and the plurality of standard segmented farmland images into a training image set according to a preset proportion.

According to an embodiment of the present disclosure, the plurality of instructions are further configured to cause the processor to:
construct the convolution neural network model based on the training image set, and optimize the convolution neural network model based on a testing image set.

According to an embodiment of the present disclosure, the plurality of instructions are further configured to cause the processor to:
convert the plurality of farmland images and the plurality of standard segmented farmland images into a plurality of images with different resolutions.

According to another aspect of the present disclosure, the plurality of instructions are further configured to cause the processor to:
construct the convolution neural network model based on the training image set; and optimize the convolution neural network model based on the testing image set.

According to an embodiment of the present disclosure, the plurality of instructions are further configured to cause the processor to:
convert the plurality of farmland images and the plurality of standard segmented farmland images into a plurality of images with different resolutions.

According to an embodiment of the present disclosure, the plurality of instructions are further configured to cause the processor to:
convert the plurality of farmland images and the plurality of standard segmented farmland images into a plurality of images with different resolutions.

BRIEF DESCRIPTION OF THE DRAWINGS

Implementations of the present disclosure will now be described, by way of embodiments, with reference to the attached figures.

DETAILED DESCRIPTION

Figure 1:
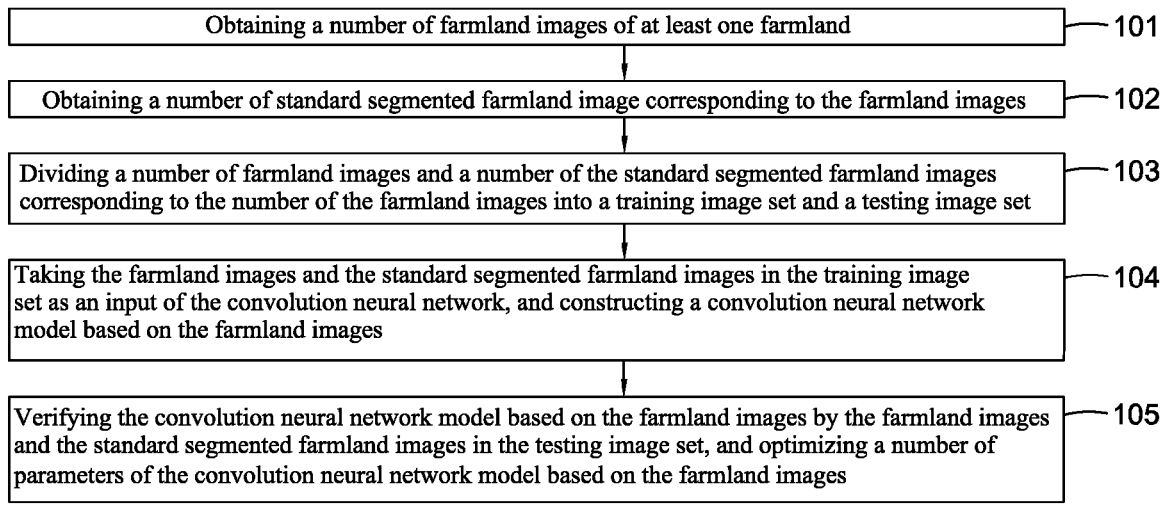
FIG. 1 is a block diagram of one embodiment of a method for constructing a convolution neural network based on farmland images.
Figure 2:
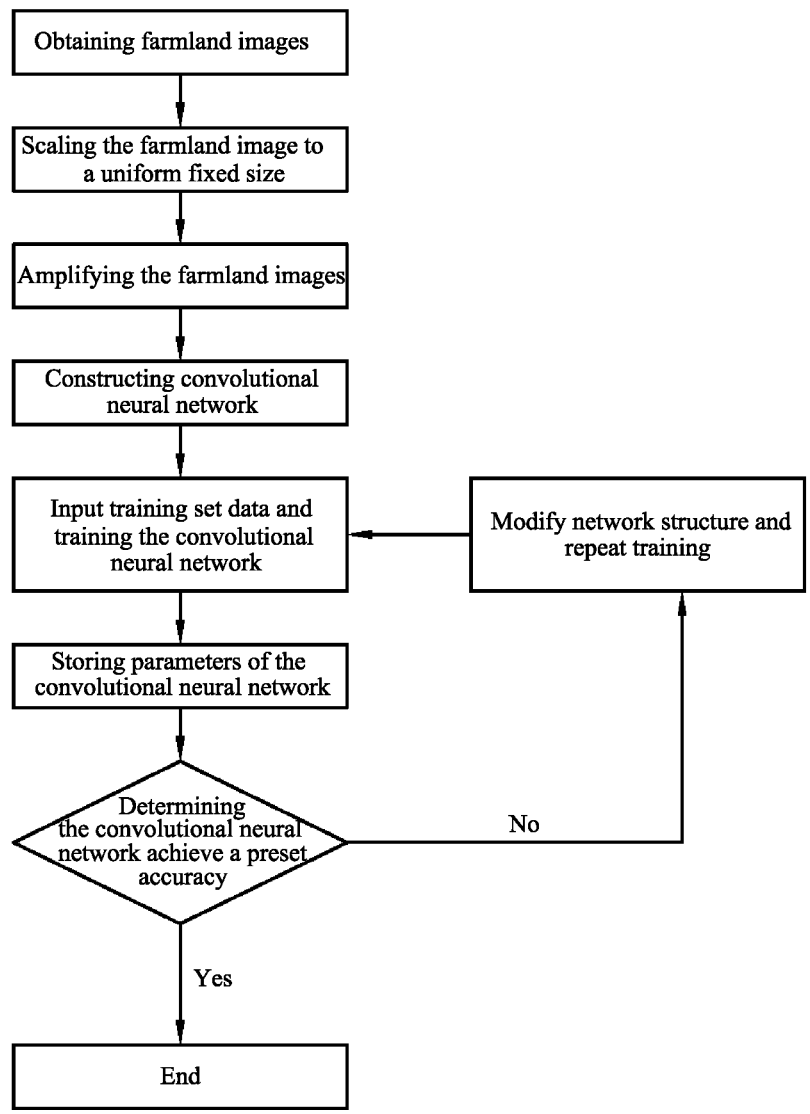
FIG. 2 is a flowchart of an embodiment of the method for constructing the convolution neural network based on farmland images.
Figure 3:
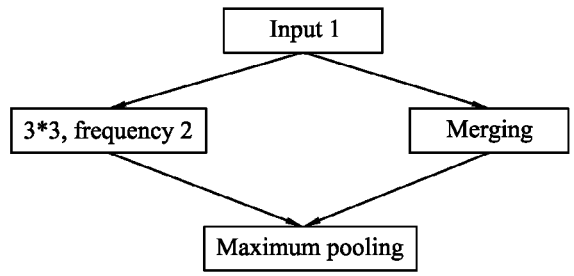
FIG. 3 is a block diagram of one embodiment of a convolution neural network model based on farmland images.
Figure 4:
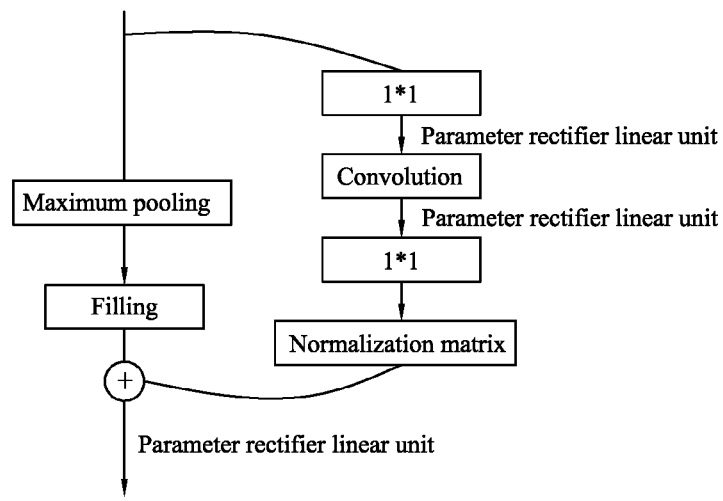
FIG. 4 is a block diagram of another embodiment of the convolution neural network model based on farmland images.
Figure 5:
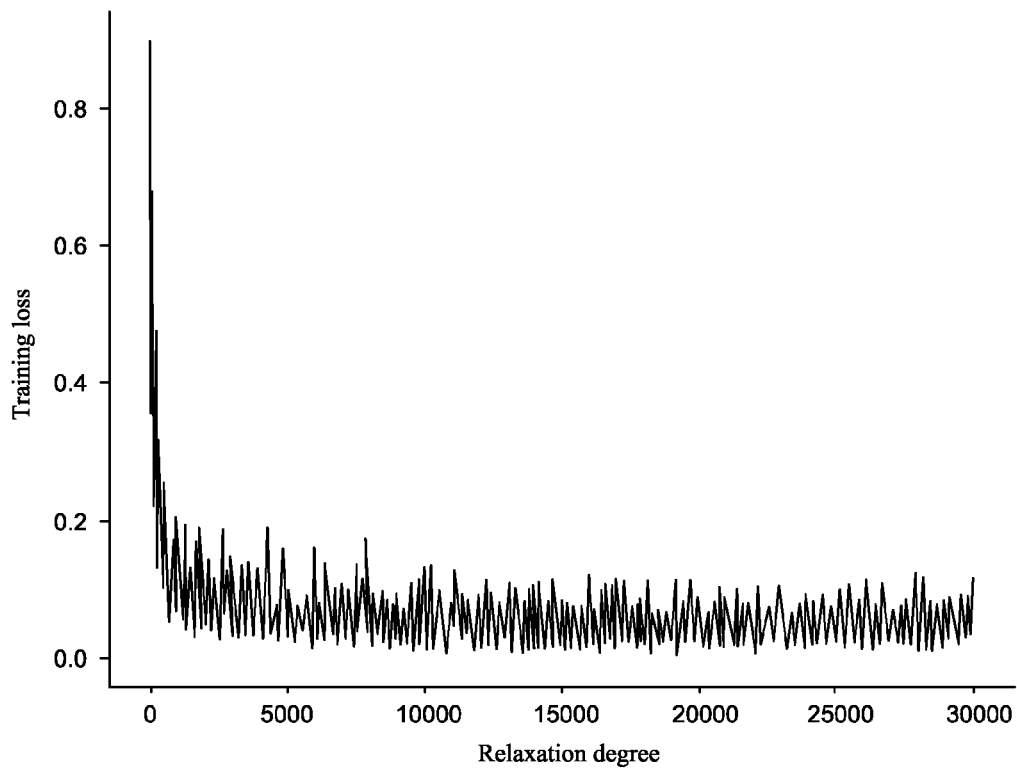
FIG. 5 is a training curve diagram of one embodiment of the convolution neural network model based on farmland image.
Figure 6:
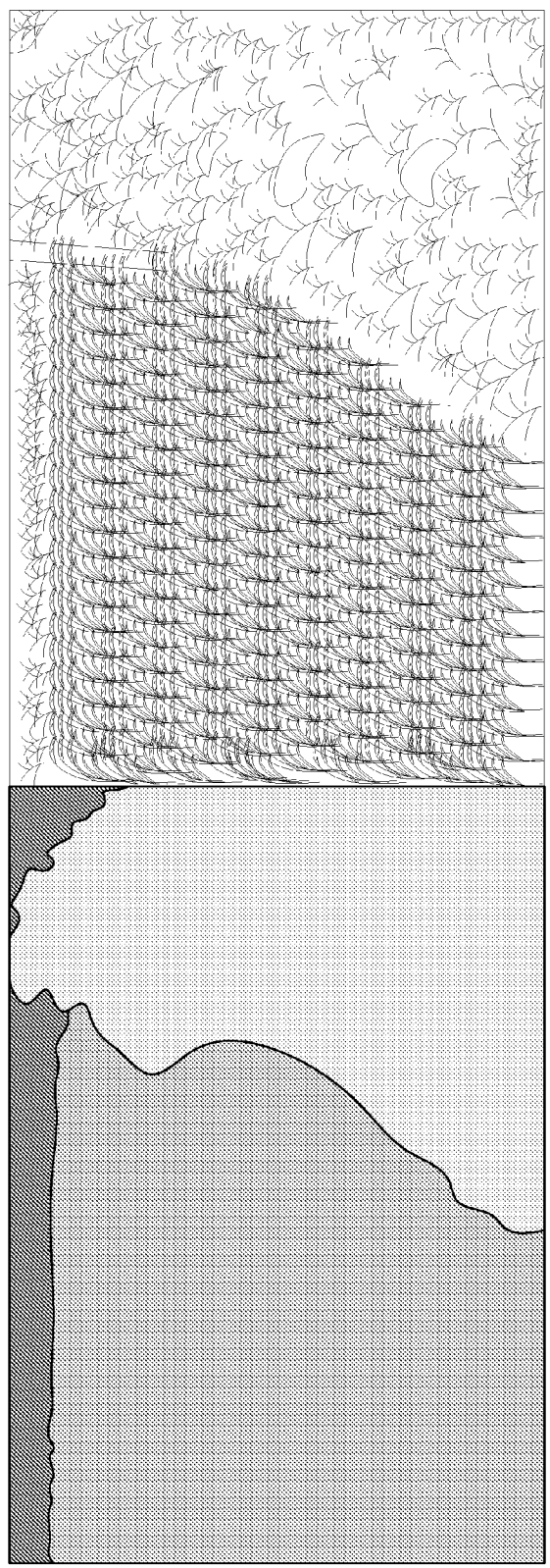
FIG. 6 is a diagram of one embodiment showing result of image segmentation of the convolution neural network model based on farmland image.
Figure 7:
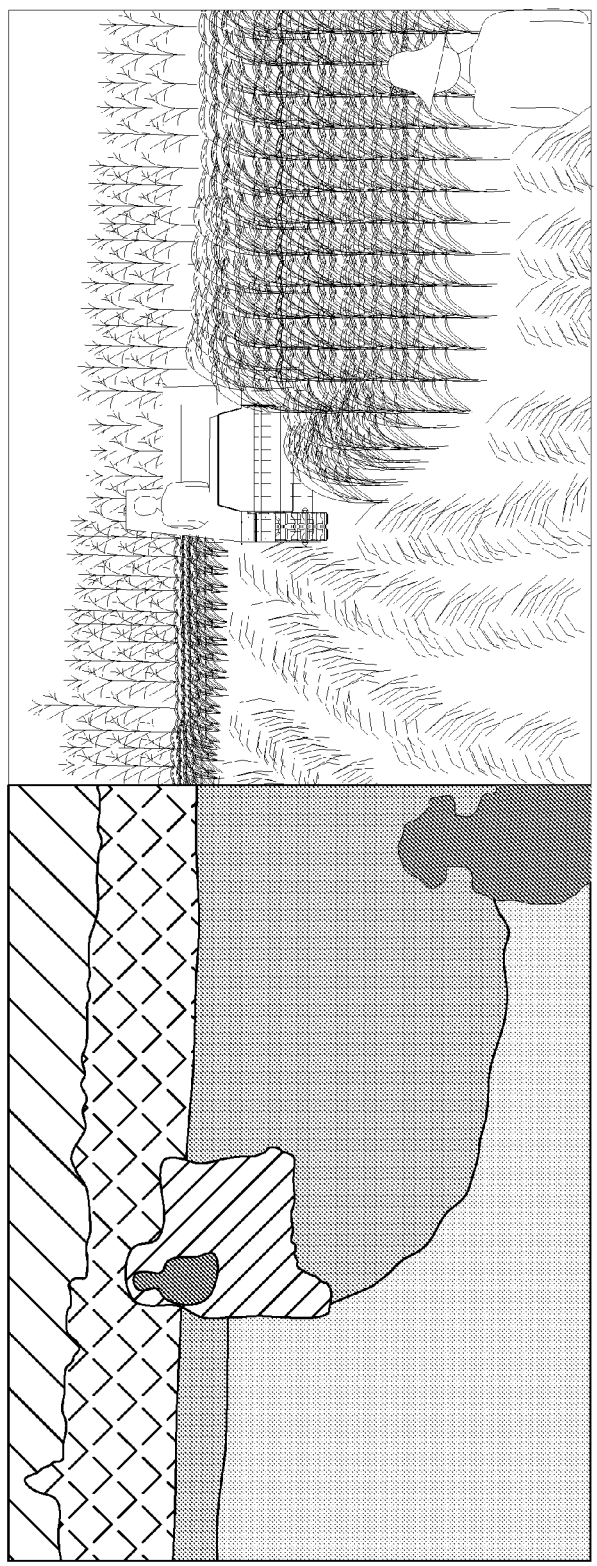
FIG. 7 is a diagram of another embodiment of image segmentation of the convolution neural network model based on farmland image.
Figure 8:
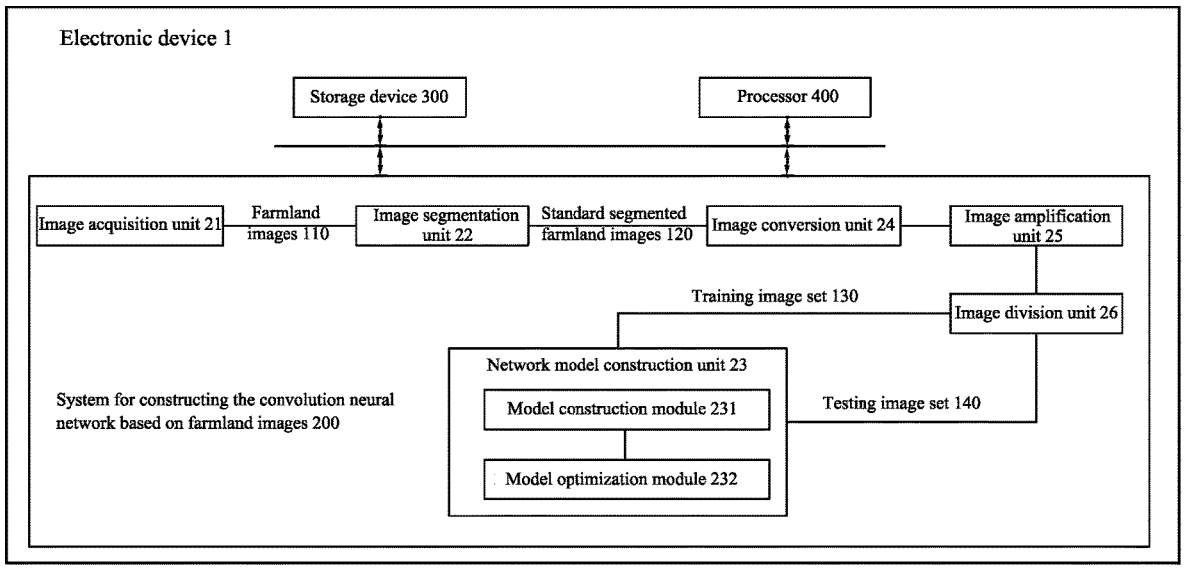
FIG. 8 is a block diagram of one embodiment of an electronic device including a system for constructing a convolution neural network based on farmland images.

The preferred embodiments described below are for example only, and technical personnel in the field can think of other obvious variant embodiments. The basic principles of the present invention as defined in the following description may be applied to other embodiments, developed embodiments, improvement schemes, equivalent schemes, and other technical schemes that do not deviate from the spirit and scope of the present invention.

The technical personnel in the art shall understand that, in the disclosure of the present invention, the term "portrait direction", "horizontal direction", "up", "down", "front", "back", "left", "right", "vertical", "horizontal", "top", "bottom", "inside", "outer" and other indicative orientation or positional relationship is based on the orientation or position relationship shown in the drawings, and is intended to facilitate the description of the present invention and simplify the description, rather than to indicate or imply that the device or component must have a specific orientation, in a specific direction and operation, therefore, the above terms are not to be understood as limitations on the present invention.

Understandably, the term "one" should be understood as "at least one" or "one or more", i.e. in one embodiment, the quantity of one component may be one, while in another embodiment the quantity of components may be multiple, and the term "one" cannot be understood as a limit on the quantity.

Referring to FIGS. 1 to 7 of the present application, a method 100 for constructing a convolution neural network based on farmland images is illustrated. the method 100 includes steps as follows.

At block 101, obtaining a number of farmland images 110 of at least one farmland.

At block 102, obtaining a number of standard segmented farmland image 120 corresponding to the farmland images 110.

At block 103, dividing a number of farmland images 110 and a number of standard segmented farmland images 120 corresponding to the number of farmland images 110 into a training image set 130 and a testing image set 140.

At block 104, taking the farmland images 110 and the standard segmented farmland images 120 in the training image set 130 as an input of the convolution neural network, and constructing a convolution neural network model based on the farmland images.

At block 105, verifying the convolution neural network model based on the farmland images by the farmland images 110 and the standard segmented farmland images 120 in the testing image set 140, and optimizing a number of parameters of the convolution neural network model based on the farmland images.

In one embodiment, between block 102 and block 103, the method further includes:

block 106: converting the farmland images 110 and the standard segmented farmland images 120 into a number of single channel grayscale images; and block 107: pre-processing the farmland images 110 and the standard segmented farmland images 120, and amplifying the farmland images 110 and the standard segmented farmland images 120 to increase a diversity of the farmland images 110 and the standard segmented farmland images 120.

In one embodiment, at block 101, the method further includes:

block 1011: obtaining at least one video of the at least one farmland;

block 1012: extracting the farmland images in the at least one video according to a number of image frames;

block 1013: eliminating farmland images that do not accord with a preset condition.

In one embodiment, the length of the at least one video of the at least one farmland is 30 s. In one embodiment, the number of videos of the at least one farmland is multiple, and the number of videos are acquired at a plurality of angles of the at least one farmland respectively.

In one embodiment, the videos of at least one farmland are obtained at different time points in one day to reduce an impact of different lighting on farmland image segmentation in the day and improve the accuracy of farmland image segmentation.

In one embodiment, the main crops planted in the at least one farmland are rice and vegetables.

In block 1013, after obtaining the farmland images 110 in the video according to the number of image frames, the method eliminates images that do not accord with the preset condition, such as blurred images, images without segmentation targets, etc., so as to improve the accuracy of the farmland images 110 and improve the accuracy of farmland image segmentation.

In block 102, the standard segmented farmland images 120 are made for each of the farmland images 110 by an image annotation tool, and the standard segmented farmland images 120 corresponding to each of the farmland images 110 are obtained.

Those skilled in the art should understand that in other preferred embodiments of the present application, the standard segmented farmland images 120 corresponding to each of the farmland image 110s can also be obtained in other ways, as long as the purpose of the present application can be achieved, and a specific method of obtaining the standard segmented farmland images 120 corresponding to each of the farmland images 110 should not constitute a limitation of the present invention.

In one embodiment, when the image annotation tool makes the standard segmented farmland images 120 for each of the farmland image 110, a label data used by the image annotation tool is divided into three categories: background, farmland and obstacles. In another embodiments of the present application, when the image annotation tool makes the standard segmented farmland images 120 for each of the farmland images 110, the label data is divided into eleven categories, namely ridge, farmland, harvester, people, harvested farmland, sky, buildings, roads, trees, electric poles and invalid. The label data is further refined to improve detection accuracy of different categories of the label data.

It can be understood that since label images required for the convolution network to calculate a loss value are single channel grayscale images, the farmland images 110 and the standard segmented farmland images 120 are converted into single channel grayscale images to facilitate the convolution network to calculate the loss value.

In block 107, in order to increase image diversity of the farmland images 110 and the standard segmented farmland images 120, to improve a generalization ability of a convolution network model, and to avoid overfitting of the convolution network model.

In one embodiment, the farmland images 110 and the segmented farmland images 120 are pre-processed. Specifically, a pre-processing method of the farmland images 110 and the standard segmented farmland images 120 amplifies image data of the farmland images 110 and the standard segmented farmland images 120 by using the methods of flipping, translating, scaling, and adding noise, so as to increase the diversity of image training data.

In block 103, the amplified farmland images 110 and the standard segmented farmland images 120 are divided into the training image set 130 and the testing image set 140 according to a ratio of 8:2.

Those skilled in the art should understand that in other preferred embodiments of the present application, the farmland images 110 and the standard segmented farmland images 120 can also be segmented into the training image set 130 and the testing image set 140 according to other ratios, such as 7:3 and 6:4, as long as the purpose of the invention can be achieved, and a segmentation ratio of the training image set 130 and the testing image set 140 does not constitute a limitation of the present application.

In block 104, taking the farmland images 110 and the standard segmented farmland images 120 in the training image set 130 as the input of the convolution neural network, the convolution neural network model based on the farmland images is constructed.

In one embodiment, the convolution neural network is an ENet network, data of the farmland images 110 and the standard segmented farmland image 120 in the training image set 130 is used as the input of the convolution neural network to train the parameters of the convolution neural network model.

In one embodiment, the activation function of the ENet network uses a PReLU activation function, $$PReLU(x_i) = \begin{cases} x_i & \text{if } x_i > 0 \\ a_i x_i & \text{if } x_i \leq 0 \end{cases},$$

$a_i$ is a learnable parameter.

Referring to Table 1 below, a table of the detailed structure of the convolutional neural network model (Table 1) is shown.

Preferably, in one preferred embodiment, the convolutional neural network model is the ENet network.

TABLE 1

| Name | Type | Output size |
|---|---|---|
| Initial | | 16*256*256 |
| bottleneck 1.0 | downsampling | 64*128*128 |
| 4*bottleneck1.x | | 64*128*128 |
| bottleneck2.0 | downsampling | 128*64*64 |
| bottleneck2.1 | | 128*64*64 |
| bottleneck2.2 | dilated 2 | 128*64*64 |
| bottleneck2.3 | asymmetric 5 | 128*64*64 |
| bottleneck2.4 | dilated 4 | 128*64*64 |
| bottleneck2.5 | | 128*64*64 |
| bottleneck2.6 | dilated 8 | 128*64*64 |
| bottleneck2.7 | asymmetric 5 | 128*64*64 |
| bottleneck2.8 | dilated 16 | 128*64*64 |
| Repeat section 2, without bottleneck2.0 | | |
| bottleneck4.0 | upsampling | 64*128*128 |
| bottleneck4.1 | | 64*128*128 |
| bottleneck4.2 | | 64*128*128 |
| bottleneck5.0 | upsampling | 16*256*256 |
| bottleneck5.1 | | 16*256*256 |
| fullconv | | C*512*512 |

In block 105, the convolutional neural network model based on the farmland images is verified with the farmland images 110 and the corresponding standard segmented farmland images 120 in the testing image set 140, and the parameters of the convolutional neural network model based on the farmland images are optimized, the data of the farmland images 110 and the corresponding standard segmented farmland images 120 in the testing image set 140 are input into the convolution neural network model based on farmland images for verification. A number of super parameters of the convolution neural network model based on the farmland images is constantly adjusted according to a verification result, so as to optimize the parameters of the convolution neural network model based on the farmland images.

In one embodiment, after the convolution neural network model based on the farmland images is verified by using the farmland images 110 and the corresponding standard segmented farmland images 120 in the testing image set 140, the convolution neural network model based on the farmland images, finally optimized, is obtained, and the optimized convolution neural network model based on the farmland images can be used to test real farmland images, and test a segmentation effect of the convolution neural network model on the real farmland images.

In one embodiment, after obtaining the farmland images 110 of the at least one farmland, it is necessary to scale a size of the farmland images 110 to a unified preset size to facilitate a subsequent processing of the farmland images 110.

In block 105, when the convolution neural network model based on the farmland images is verified by using the farmland images 110 and the standard segmented farmland images 120 in the testing image set 140, and when the verification result does not accord with a preset condition as to accuracy, such as the image segmentation error exceeding the preset condition, then a network structure of the convolution neural network model based on the farmland images is modified, and the farmland images 110 and the corresponding standard segmented farmland image 120 in the training image set 130 are used to reconstruct the convolution neural network model based on the farmland image. When the verification result accords with the preset accuracy condition, the verification process ends.

In a second preferred embodiment of the present application, in block 104, the farmland images 110 and the corresponding standard segmented farmland images 120 in the training image set 130 are taken as the input of the convolution neural network, the construction of the convolution neural network model based on the farmland images further includes:

block 1041: converting the farmland images 110 and the corresponding standard segmented farmland images 120 in the training image set 130 into a variety of images with different resolutions;

block 1042: processing the variety of images with different resolutions by a number of independent networks to obtain a number of images of features;

block 1043: scaling the number of feature images into the feature images with the same resolution, and merging the scaled feature images into a fusion image:

block 1044: inputting the fusion image into the convolution neural network, and constructing the convolution neural network model based on the farmland image.

In block 1041, the farmland images 110 and the corresponding standard segmented farmland images 120 in the training image set 130 are respectively converted into images with three different resolutions, the three different resolutions including images with full resolution 480*640, images with half resolution 240*320, and images with three-quarter resolution 360*480.

In one embodiment, in block 1042, the images with full resolution 480*640 are processed by the improved ENet network to obtain the corresponding feature images. The images with half resolution 240*320 and the images with three-quarters resolution 360*480 are processed by the ENet network to obtain the corresponding feature images, wherein when the images with half resolution 240*320 and the images with three-quarters resolution 360*480 are processed by the ENet network. A downsampling part of the ENet network is used to process the images to obtain the feature images, and the feature images do up-sampling at an eightfold to obtain original resolution feature images input in the ENet network.

In block 1043, when scaling the number of feature images into the feature images with the same resolution, and merging the scaled feature images into a fusion image, the scaled feature images are merged by a maximum value method, a formula of the maximum value method is, $F_i = \max(X_i, Y_i, Z_i)$. The fusion image obtained by merging the feature images into a final softmax layer for calculation of a softmax function, and the softmax function is $$p_l = \frac{e^{x(l)}}{\sum_L e^{x(l)}},$$

where $p_l$ is a probability.

In a third embodiment of the present application, in block 104, the farmland images 110 and the corresponding standard segmented farmland images 120 in the training image set 130 are used as the input of the convolution neural network to construct the convolution neural network model based on the farmland images, and in the third embodiment of the present application, the ENet network is modified, and all the up-sampling layers in the sampling process of the ENet network are replaced with a deconvolution layer.

In a fourth embodiment of the present application, in block 104, the farmland images 110 and the corresponding standard segmented farmland images 120 in the training image set 130 are used as the input of the convolution neural network to construct the convolution neural network model based on the farmland image. In the fourth embodiment, a volume set layer with convolution kernel size of (1,1) is added after the ENet network merging all layers.

In a fifth embodiment of the present application, in block 105, the convolutional neural network model based on the farmland images is verified with the farmland images 110 and the corresponding standard segmented farmland image 120 in the testing image set 140, and the parameters of the convolutional neural network model based on the farmland images are optimized.

In the fifth embodiment, the optimized parameters of the convolutional neural network model are processed, and a number of parameters of BatchNorm layers are combined and integrated into the convolution layers to improve a testing speed of the convolutional neural network model. In one embodiment, W is convolution weighting, B is convolution offset, a convolution layer operation being w*x+B. μ is a mean value of the BatchNorm layers, σ is a variance value of the BatchNorm layers, γ is a scaling factor of the BatchNorm layers, and β is an offset value of the BatchNorm layers, which is a smaller decimal (to prevent the denominator from being zero).

$$\epsilon : \mu \leftarrow \frac{1}{m} \sum_{i=1}^{m} x_i$$

$$\sigma^2 \leftarrow \frac{1}{m} \sum_{i=1}^{m} (x_i - \mu)^2,$$

$$\hat{x}_i \leftarrow \frac{x_i - \mu}{\sqrt{\sigma^2 + \epsilon}} \quad y_i \leftarrow \gamma \hat{x}_i,$$

after a combination of the BatchNorm layers and the convolution layers, $$\alpha = \frac{\gamma}{\sqrt{\sigma^2 + \epsilon}},$$

$$W_{merged} = W \times \alpha \quad B_{merged} = B \times \alpha + (\beta - \mu \times \alpha).$$

Referring to Table 2, which shows a comparison of an effect after merging the BatchNorm layers to the convolution layers (the resolution of farmland images are 480*640).

It can be seen from Table 2 that the detection speed is significantly improved after merging the BatchNorm layers to the convolution layers.

TABLE 2

| Model | CPU forward time | CPU forward time |
|---|---|---|
| Enet (before mereging) | 876.509 ms | 73.106 ms |
| Enet (after mereging) | 698.995 ms | 11.3344 ms |
| Improvement efficiency | 20.3% | 85.1% |

In sixth embodiment of the present application, in block 105, the convolution neural network model based on the farmland images is verified with the farmland images 110 and the corresponding standard segmented farmland image 120 in the testing image set 140, and the parameters of the convolution neural network model based on the farmland images are optimized. In the sixth embodiment, Gaussian condition is added to the optimized convolution neural network model for random processing to further refine the effect of boundary segmentation of the convolution neural network model.

According to another aspect of the present application, the present application further provides an electronic device 1. The electronic device 1 includes a system 200 for constructing a convolution neural network based on farmland images, a storage device 300, and a at least one processor 400. The at least one processor 400 is used to execute the system 200 for constructing a convolution neural network based on farmland images and other applications, such as an operating system, installed in the electronic device 1. In one embodiment, the electronic device 1 can be a mobile phone, a tablet computer, a personal digital assistant, a notebook computer, or other suitable computing device.

The storage device 300 stores the computerized instructions of the system 200 for constructing a convolution neural network based on farmland images, and one or more programs, such as the operating system and applications of the electronic device 1. The storage device 300 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example.

In one embodiment, the system 200 includes:
an image acquisition unit 21, configured to obtain a number of farmland images 110 of at least one farmland;
an image segmentation unit 22, configured to segment the farmland images 110 to obtain standard segmented farmland images 120 corresponding to the farmland images 110;
a network model construction unit 23, configured to construct a convolution neural network model based on the farmland images based on the farmland images 110 and the corresponding standard segmented farmland images 120.

In one embodiment, the system 200 further includes an image conversion unit 24. The image conversion unit 24 is operably connected to the image acquisition unit 21 and the image segmentation unit 22, and the image conversion unit 24 is used to convert the farmland images 110 and the corresponding standard segmented farmland images 120 into single channel grayscale images, so as to facilitate a convolution network to calculate a loss value.

The system 200 for constructing the convolution neural network based on the farmland images further includes an image amplification unit 25. The image amplification unit is connected to the image acquisition unit 21 and the image segmentation unit 22, and the image amplification unit 25 is used to amplify the farmland images 110 and the standard segmented farmland images 120, so as to increase a diversity of the farmland images 110 and the standard segmented farmland images 120.

In one embodiment, the image amplification unit 25 can amplify the farmland images 110 and the standard separated farmland images 120 by turning images, translating images, scaling images, adding noise on the images and other methods, so as to increase the diversity of the farmland images 110 and the standard separated farmland images 120 and improve a generalization ability of the convolution neural network model, and avoid over fitting of the convolution neural network model.

In one embodiment, the system 200 for constructing the convolution neural network based on the farmland images further includes an image division unit 26. The image division unit 26 is connected to the image acquisition unit 21 and the image segmentation unit 22 respectively. The image division unit 26 is used to divide the farmland images 110 and the standard segmented farmland images 120 into a training image set 130 and a testing image set 140 according to a preset proportion. In one embodiment, the image division unit 26 divides the farmland images 110 and the standard segmented farmland images 120 into the training image set 130 and the testing image set 140 according to a ratio of 8:2. The network model construction unit 23 is used to construct a corresponding convolutional neural network model based on the training image set 130 and the testing image set 140.

The network model construction unit 23 includes a model construction module 231 and a model optimization module 232. The model construction module 231 is used to construct a convolution neural network model based on the training image set 130. The model optimization module 232 is used to verify the convolution neural network model based on the farmland image constructed by the model construction module 231 based on the testing image set 140 and optimize the parameters of the convolution neural network model based on the farmland images.

In one embodiment, The word "module" or "unit" as used herein, refers to logic embodied in hardware or firmware, or to a collection of software instructions, written in a programming language, such as, for example, Java, C, or assembly. One or more software instructions in the function modules may be embedded in firmware. It will be appreciated that the function modules may include connected logic modules, such as gates and flip-flops, and may include programmable modules, such as programmable gate arrays or processors. The function module described herein may be implemented as either software and/or hardware modules and may be stored in a storage device.

Figure 9:
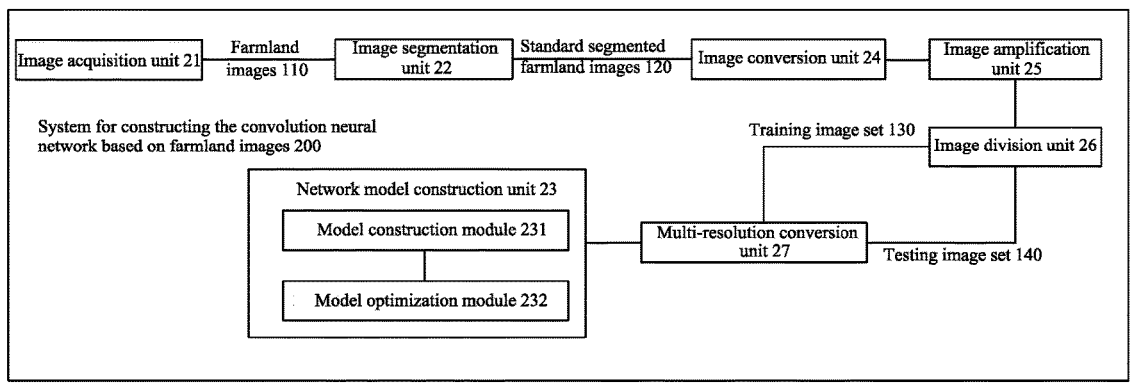
FIG. 9 is a block diagram of another embodiment of the system for constructing a convolution neural network based on farmland images.
Figure 10:
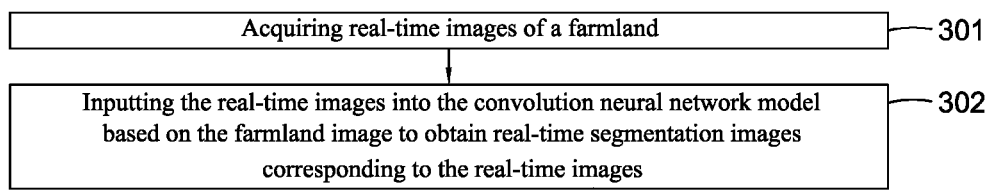
FIG. 10 is a block diagram of one embodiment of a farmland image segmentation method based on a convolution neural network model of farmland images.

Referring to FIG. 9, a modified embodiment of the system 200 provided by the present invention is described. The system 200 for constructing the convolution neural network based on the farmland images further includes a multi-resolution conversion unit 27, the multi-resolution conversion unit 27 is operatively connected to the image acquisition unit 21 and the image segmentation unit 22, respectively. The multi-resolution conversion unit 27 is used to convert the farmland images 110 and the standard segmented farmland images 120 into a number of images with different resolutions, preferably, the multi-resolution conversion unit 27 is used to convert the farmland images 110 and the standard segmented farmland images 120 into images with three different resolutions, where the images with three different resolutions includes images with full resolution 480*640, images with half resolution 240*320 and images with three-quarter resolution 360*480.

In one embodiment, in block 1042, the images with full resolution 480*640 are processed by the improved ENet network to obtain the corresponding feature images. The images with half resolution 240*320 and the three-quarters resolution 360*480 are processed by the ENet network to obtain the corresponding feature images, wherein when the images with half resolution 240*320 and the images with three-quarters resolution 360*480 are processed by the ENet network, a down sampling part of the ENet network is used to process the images to obtain the feature images, and the feature images do up-sampling at an eightfold to obtain original resolution feature images input in the ENet network.

In block 1043, when scaling the number of feature images into the feature images with the same resolution, and merging the scaled feature images into a fusion image, the scaled feature images are merged by a maximum value method, a formula of the maximum value method is, $F_i=\max(X_i, Y_i, Z_i)$. The fusion image obtained by merging the feature images into a final softmax layer for calculation of a softmax function, and the softmax function is $$p_l = \frac{e^{x(l)}}{\sum_L e^{x(l)}},$$

where $p_l$ is a probability.

According to another aspect of the s, the s further provides a farmland image segmentation method 300, the method includes:

block 301, acquiring real-time images of a farmland; and
block 302, inputting the real-time images into the convolution neural network model based on the farmland image to obtain real-time segmentation images corresponding to the real-time images.

In one embodiment, a method for constructing a convolution neural network model based on the farmland image includes:

block 101, obtaining a number of farmland images 110 of at least one farmland;
block 102, obtaining a number of standard segmented farmland images 120 corresponding to the farmland images 110;
block 103, dividing a number of farmland images 110 and a number of standard segmented farmland images 120 corresponding to the number of farmland images 110 into a training image set 130 and a testing image set 140;
block 104, taking the farmland images 110 and the standard segmented farmland images 120 in the training image set 130 as an input of the convolution neural network, and constructing a convolution neural network model based on the farmland images;
block 105, verifying the convolution neural network model based on the farmland images by the farmland images 110 and the standard segmented farmland images 120 in the testing image set 140, and optimizing a number of parameters of the convolution neural network model based on the farmland images.

According to another aspect of the present application, the present application further provides a convolution neural network model based on the farmland images. A method for constructing the convolution neural network model based on the farmland image includes:

block 101, obtaining a number of farmland images 110 of at least one farmland;
block 102, obtaining a number of standard segmented farmland images 120 corresponding to the farmland images 110;
block 103, dividing a number of farmland images 110 and a number of standard segmented farmland images 120 corresponding to the number of farmland images 110 into a training image set 130 and a testing image set 140;
block 104, taking the farmland images 110 and the standard segmented farmland images 120 in the training image set 130 as an input of the convolution neural network, and constructing a convolution neural network model based on the farmland images;

block 105, verifying the convolution neural network model based on the farmland images by the farmland images 110 and the standard segmented farmland images 120 in the testing image set 140, and optimizing a number of parameters of the convolution neural network model based on the farmland images.

In the description of the specification, the description referring to the terms "one embodiment", "some embodiments", "examples", "specific examples", or "some examples" means that the specific features, structures, materials or features described in connection with the embodiments or examples are included in at least one embodiment or example of the present invention. In the specification, a schematic expression of the above terms does not have to be for the same embodiments or examples. Further, the specific features, structures, materials or features described may be combined in any one or more embodiments or examples in a suitable manner. In addition, without contradiction, those skilled in the art can combine and combine different embodiments or examples described in this specification.

Those skilled in the art should understand that the above description and the embodiments of the present disclosure shown in the drawings are only examples and do not limit the present disclosure. The purpose of the present disclosure has been completely and effectively achieved. The function and structure principle of the present disclosure have been shown and explained in the embodiments. Without departing from the principle, the implementation of the present disclosure may have any deformation or modification.

What is claimed is:

1. A method for constructing a convolution neural network based on farmland images, comprising:
   step 101, obtaining a plurality of farmland images of at least one farmland, and scaling a size of the plurality of the farmland images to a unified preset size;
   step 102, obtaining a plurality of standard segmented farmland images corresponding to the plurality of farmland images;
   step 103, dividing the plurality of farmland images and the plurality of standard segmented farmland images into a training image set and a testing image set;
   step 104, taking the plurality of farmland images and the plurality of standard segmented farmland images in the training image set as an input of the convolution neural network, and constructing a convolution neural network model based on the plurality of farmland images;
   step 105, verifying the convolution neural network model based on the plurality of farmland images by the plurality of farmland images and the standard segmented farmland images in the testing image set, and optimizing a plurality of parameters of the convolution neural network model based on the plurality of farmland images, the step 104 further comprising:
   step 1041, converting the farmland images with the unified preset size and the standard segmented farmland images in the training image set respectively into a variety of images with different resolution sizes;
   step 1042, processing the variety of images with different resolution sizes by a plurality of independent convolution neural networks to obtain a plurality of feature images, and the plurality of independent convolution neural networks comprising an improved ENet network, and a ENet network;

step 1043, scaling the plurality of the feature images into the feature images with the same resolution, and merging the scaled feature images into a fusion image;
   step 1044, inputting the fusion image into the convolution neural network, and constructing the convolution neural network model based on the farmland images.

2. The method for constructing a convolution neural network based on farmland images according to claim 1, wherein between the step 102 and the step 103, the method further comprises:
   step 106, converting the plurality of farmland images and the plurality of standard segmented farmland images into a plurality of single channel grayscale images; and
   step 107, preprocessing the plurality of farmland images and the plurality of standard segmented farmland images respectively, and amplifying the plurality of farmland images and the plurality of standard segmented farmland images to increase a diversity of the plurality of farmland images and the plurality of standard segmented farmland images.

3. The method for constructing a convolution neural network based on farmland images according to claim 1, wherein the step 101 further comprises:
   step 1011, obtaining at least one video of the at least one farmland;
   step 1012, extracting the plurality of farmland images in the at least one video according to a plurality of image frames;
   step 1013, eliminating farmland images that do not accord with a preset condition.

4. The method for constructing a convolution neural network based on farmland images according to claim 1, wherein the step 103 further comprises:
   dividing the plurality of farmland images and the plurality of standard segmented farmland images into the training image set and the testing image set according to a ratio of 8:2.

5. The method for constructing a convolution neural network based on farmland images according to claim 1, wherein the convolution neural network is an ENet network with a PReLU activation function, $$PReLU(x_i) = \begin{cases} x_i & \text{if } x_i > 0 \\ a_i x_i & \text{if } x_i \leq 0 \end{cases},$$

$a_i$ is a learnable parameter.

6. The method for constructing a convolution neural network based on farmland images according to claim 1, wherein the step 1041 further comprises:
   converting the plurality of farmland images and the plurality of standard segmented farmland images in the training image set into images of three different resolutions, wherein the images with three different resolutions comprise images with full resolution 480*640, images with half resolution 240*320 and images with three-quarter resolution 360*480.

7. The method for constructing a convolution neural network based on farmland images according to claim 6, wherein the step 1042 further comprises:
   processing the images with full resolution 480*640 by the improved ENet network to obtain the plurality of feature images corresponding to the images with full resolution 480*640;
   processing the images with half resolution 240*320 and the images with three-quarters resolution 360*480 by the ENet network to obtain the plurality of feature images corresponding to the images with half resolution 240*320 and the images with three-quarters resolution 360*480.

8. The method for constructing a convolution neural network based on farmland images according to claim 1, wherein the step 105 further comprises:
merging a plurality of parameters of BatchNorm layers of an optimized convolutional neural network model into convolution layers of the convolutional neural network model to improve a testing speed of the convolutional neural network model.

9. The method for constructing a convolution neural network based on farmland images according to claim 1, wherein the step 105 further comprises:
adding Gaussian condition to an optimized convolution neural network model for random processing, and refining boundary segmentation of the convolution neural network model.

10. A convolution neural network model based on farmland images, wherein the convolution neural network model based on farmland images is applied in a method for constructing a convolution neural network based on the farmland images, the method comprises:
step 101, obtaining a plurality of farmland images of at least one farmland, and scaling a size of the plurality of the farmland images to a unified preset size;
step 102, obtaining a plurality of standard segmented farmland images corresponding to the plurality of farmland images;
step 103, dividing the plurality of farmland images and the plurality of standard segmented farmland images into a training image set and a testing image set;
step 104, taking the plurality of farmland images and the plurality of standard segmented farmland images in the training image set as an input of the convolution neural network, and constructing the convolution neural network model based on the plurality of farmland images;
step 105, verifying the convolution neural network model based on the plurality of farmland images by the plurality of farmland images and the plurality of standard segmented farmland images in the testing image set, and optimizing a plurality of parameters of the convolution neural network model based on the plurality of farmland images, the step 104 further comprising:
step 1041, converting the farmland images with the unified preset size and the standard segmented farmland images in the training image set respectively into a variety of images with different resolution sizes;
step 1042, processing the variety of images with different resolution sizes by a plurality of independent convolution neural networks to obtain a plurality of feature images, and the plurality of independent convolution neural networks comprising an improved ENet network, and a ENet network;
step 1043, scaling the plurality of the feature images into the feature images with the same resolution, and merging the scaled feature images into a fusion image;
step 1044, inputting the fusion image into the convolution neural network, and constructing the convolution neural network model based on the farmland images.

11. An electronic device comprising:
a processor; and
a non-transitory storage medium coupled to the processor and configured to store a plurality of instructions, which cause the processor to:
obtain a plurality of farmland images of at least one farmland, and scale a size of the plurality of the farmland images to a unified preset size;
segment the plurality of farmland images to obtain a plurality of standard segmented farmland images corresponding to the plurality of farmland images;
divide the plurality of farmland images and the plurality of standard segmented farmland images into a training image set and a testing image set according to a preset proportion:
construct a convolution neural network model based on the training image set, comprising:
converting the farmland images with the unified preset size and the standard segmented farmland images in the training image set respectively into a variety of images with different resolution sizes;
processing the variety of images with different resolution sizes by a plurality of independent convolution neural networks to obtain a plurality of feature images, and the plurality of independent convolution neural networks comprising an improved ENet network, and a ENet network;
scaling the plurality of the feature images into the feature images with the same resolution, and merging the scaled feature images into a fusion image;
inputting the fusion image into the convolution neural network, and constructing the convolution neural network model based on the farmland images; and
optimize the convolution neural network model based on the testing image set.

12. The electronic device as recited in claim 11, wherein the plurality of instructions are further configured to cause the processor to:
convert the plurality of farmland images and the plurality of standard segmented farmland images into single channel grayscale images.

13. The electronic device as recited in claim 12, wherein the plurality of instructions are further configured to cause the processor to:
amplify the plurality of farmland images and the plurality of standard segmented farmland images.

* * * * *